H. S. SWANSON.
PORTABLE WAGON DUMP AND GRAIN ELEVATOR.
APPLICATION FILED FEB. 24, 1908.
966,062.
Patented Aug. 2, 1910.
2 SHEETS—SHEET 1.
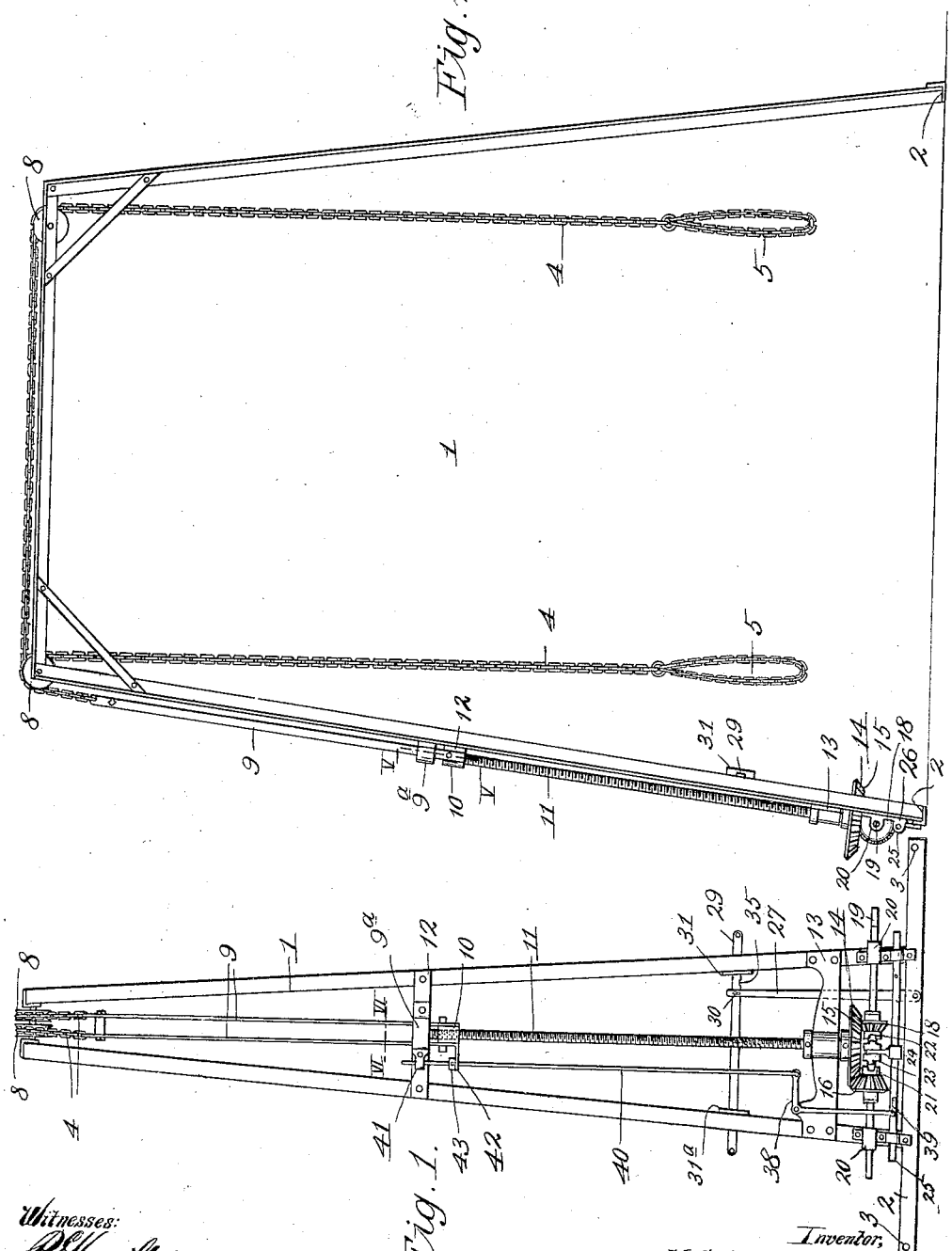

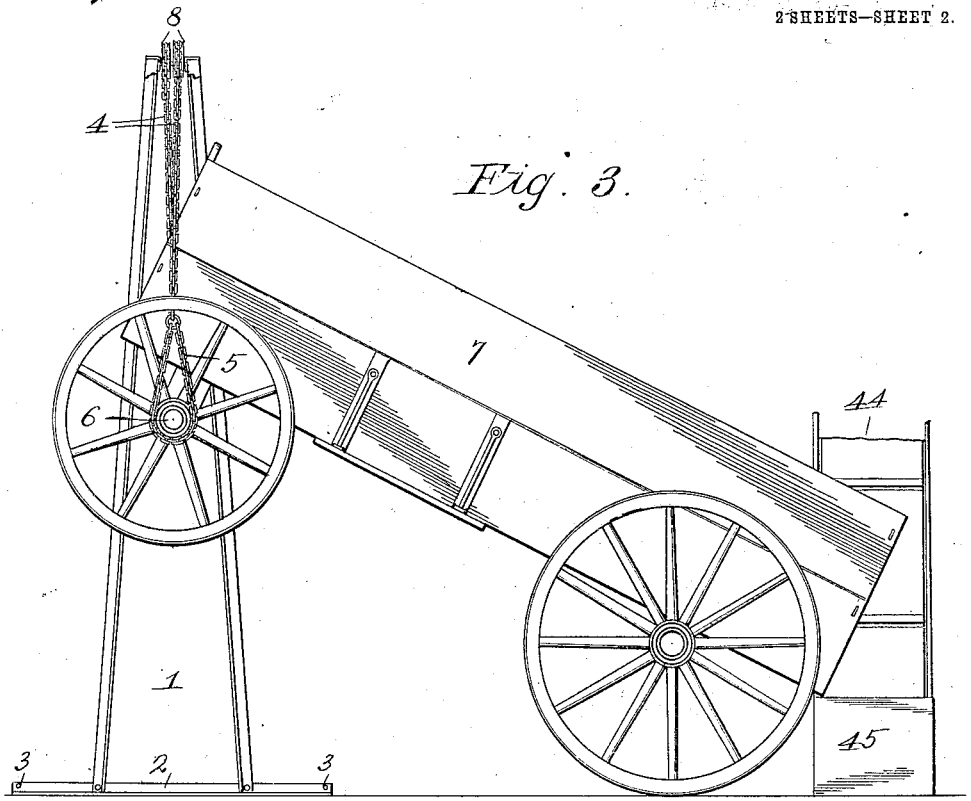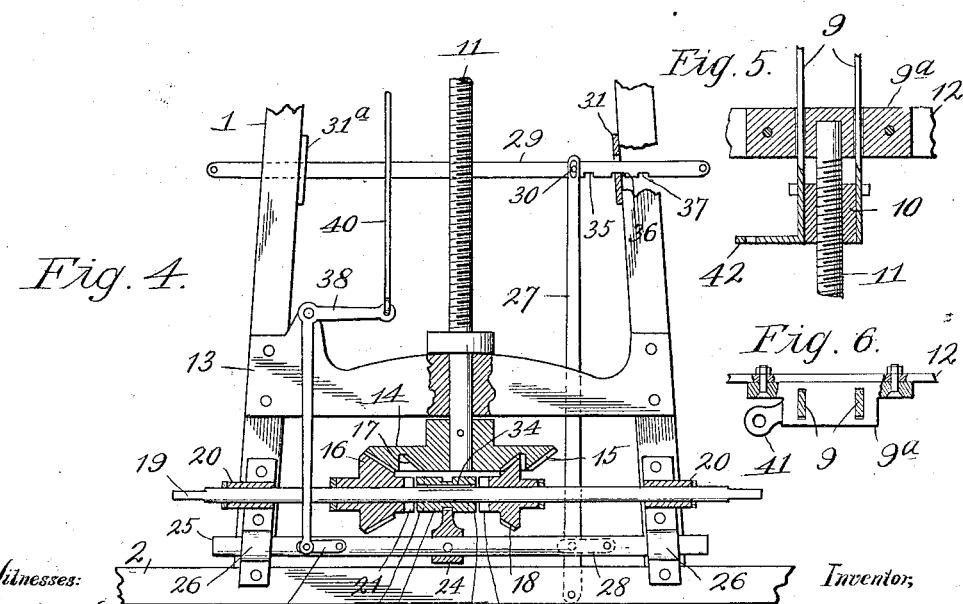

UNITED STATES PATENT OFFICE.

HERMAN S. SWANSON, OF SHENANDOAH, IOWA.

PORTABLE WAGON-DUMP AND GRAIN-ELEVATOR.

966,062.  Specification of Letters Patent.  Patented Aug. 2, 1910.

Application filed February 24, 1908. Serial No. 417,368.

*To all whom it may concern:*

Be it known that I, HERMAN S. SWANSON, a citizen of the United States, residing at Shenandoah, in the county of Page and State of Iowa, have invented certain new and useful Improvements in Portable Wagon-Dumps and Grain-Elevators, of which the following is a specification.

This invention relates to improvements in portable wagon dumps and grain elevators, and my object is to provide a simple apparatus for unloading grain-laden wagons and elevating the contents thereof into the loft of a barn or other place of storage.

In order that the invention may be fully understood, reference will now be made to the accompanying drawings, in which:

Figure 1 represents a side elevation of the apparatus. Fig. 2 represents a front elevation of the apparatus. Fig. 3 represents a broken side elevation of the apparatus hoisting the front end of a wagon. Fig. 4 is an enlarged broken side elevation partly in section of the lower portion of the apparatus. Figs. 5 and 6 are detail sectional views taken on lines V—V and VI—VI of Figs. 2 and 1, respectively.

In carrying out the invention I employ a frame 1, which is, preferably, arched so that a wagon may be driven under the same. Said frame is mounted upon a pair of runners 2 provided with holes 3 at their ends so that a team may be hitched thereto when it is desired to move the apparatus from place to place.

4 designates hoisting devices in the form of two cables provided at their lower ends with loops 5, adapted to engage the front hubs 6 of a wagon 7 preparatory to tipping the same to the position shown in Fig. 3. Cables 4 travel on overhead sheaves 8, journaled in the upper portion of the frame, and are attached at their upper ends to a pair of pull-bars 9, secured at their lower ends to a traveling-nut 10 and extending through a guide 9ᵃ. Nut 10 is mounted upon a screw 11 journaled in cross-bars 12 and 13 on one side of the frame.

Screw 11 is provided at its lower end with a double bevel gear wheel 14 having an outer row of teeth 15 which are in constant mesh with a pinion 16, and an inner row of teeth 17 which are in constant mesh with a pinion 18. Pinions 16 18 are loosely mounted upon a drive-shaft 19 journaled in bearings 20 secured to the lower portion of frame 1. Shaft 19 may be driven by a horse-power mechanism or other source of motive force, not shown.

Pinions 16 18 are provided at the inner sides of their hubs with clutch members 21 22, respectively, for a purpose hereinafter described. Pinions 16 18 are alternately locked upon the drive-shaft by a shifting mechanism consisting of a sleeve 23 on shaft 19, a yoke 24 engaging said sleeve, a sliding shaft 25 carrying the yoke and slidably mounted in a pair of bearings 26, a lever 27 pivotally secured at its lower end to the adjacent runner and connected to shaft 25 by means of a link 28, and a manually-operable shifting-bar 29, having a pin-and-slot connection 30 to the upper end of lever 27, and slidably arranged in a pair of brackets 31 31ᵃ secured to the adjacent side of frame 1.

Sleeve 23 is provided at one end with a clutch member 32 adapted to engage clutch member 21 on pinion 16, and at its opposite end with a clutch member 33 adapted to engage clutch member 22 on pinion 18. Sleeve 23 is slidably mounted on drive-shaft 19, but is caused to rotate therewith by a feather 34.

Shifting-bar 29 is provided near one end with shallow notches 35, 36 and 37, any one of which is adapted to engage brackets 31.

Sliding-shaft 25 is automatically shifted to throw the yoke to a neutral position between clutch members 21 and 22 by means of an automatic tripping mechanism consisting of nut 10, a bell-crank lever 38 connected to shaft 25 by means of a link 39, a rod 40 pivotally connected at its lower end to the bell-crank lever and extending through an eye 41 on guide 9ᵃ, a trip-arm 42 formed by the outturned lower end of one of bars 9, and a collar 43 adjustably fixed to bar 40 so that it may be set at any point on said bar.

44 designates an elevator for raising the grain dumped from the wagon to the place of storage, said elevator being provided with a hopper 45 into which the load is dumped.

In practice the wagon is driven beneath the arched frame until the hubs on the front wheels thereof are opposite loops 5 on the hoisting-cables. The latter are then swung outward between the spokes of the wheels so as to contact with the innersides of the fellies and thus prevent the loops from slipping off the hubs while raising and lowering the front end of the wagon. Bar 29 is then shifted in one direction to interlock the sleeve with one of the pinions for the purpose of rotating the screw and causing the nut 10 to travel downwardly thereon, for the purpose of hoisting the front end of the wagon.

As the nut approaches the end of its downward stroke, arm 42 will contact with the upper end of the bell-crank lever 38, and, through the intermediacy of the intervening connections, automatically shift the sleeve 23 to a neutral position between the pinions 16 and 18 and thus stop the screw. After the load has been discharged, bar 29 is thrown in the opposite direction so that the other pinion will engage bevel gear wheel 14 and rotate the screw in a reverse direction to that first referred to. This will cause the nut to travel upward until arm 42 contacts with and lifts collar 43 and thereby, through the intermediacy of the intervening mechanism, throw sleeve 23 to a neutral position between pinions 16 and 18. When the sleeve is thrown into engagement with pinion 16 it is secured against accidental disengagement by notch 37 engaging bracket 31, and when the sleeve is thrown into engagement with pinion 18 it is secured from accidental disengagement by notch 35 engaging said bracket, but as both of these notches are shallow they will not prevent the automatic tripping mechanism from throwing the sleeve to a neutral position between the pinions where it will be held by notch 36 engaging brackets 31.

The travel of the nut between bell-crank lever 38 and collar 43 may be arrested at any time on throwing the sleeve to a neutral position by proper manipulation of the shifting-bar 29. This is desirable when unloading the wagon, as it permits gradual discharge of the load and thus prevents choking of the hopper.

Having thus described my invention, what I claim is:—

1. In a device of the character described, the combination of the hoisting mechanism, two sets of gearing for differentially operating the hoisting mechanism, an intermediate clutch for engaging either set of gearing, means for automatically shifting the clutch means, said means comprising a horizontal shaft slidable in the hoisting frame, a bell crank linked to said shaft and pivoted on said frame, a vertical rod pivoted to the free arm of said crank, and adapted to be operatively engaged by said hoisting mechanism to shift said clutch means, and a manual shifting means consisting of a second horizontal shaft, a vertical rod having a pin and slot connection therewith, and a link connection with said first mentioned shaft, and means for engaging notches formed in said second shaft, to lock it against movement.

2. An apparatus of the character described, consisting of a bridged frame, cables suspended from said frame and having their upper ends passing over sheaves mounted upon a common shaft, pull bars secured to said upper ends of the cables, a nut secured to the opposite ends of said pull bars, a screw journaled in said frame and threaded into said nut, a gear wheel mounted on the lower end of said screw, shifting mechanism in operative connection with said gear wheel to change the direction of rotation of said screw, and means in operative connection with said nut and said shifting mechanism to place said shifting mechanism in neutral position at predetermined intervals.

In testimony whereof I affix my signature, in the presence of two witnesses.

HERMAN S. SWANSON.

Witnesses:
PEARL ROLL,
C. A. WENSTRAND.